Sept. 1, 1970   SHEN WU WAN   3,526,477
PROCESS FOR MAKING TITANIUM DIOXIDE
Filed March 4, 1968   2 Sheets-Sheet 1

INVENTOR.
SHEN WU WAN
BY Theodore C. Virgel
ATTORNEY

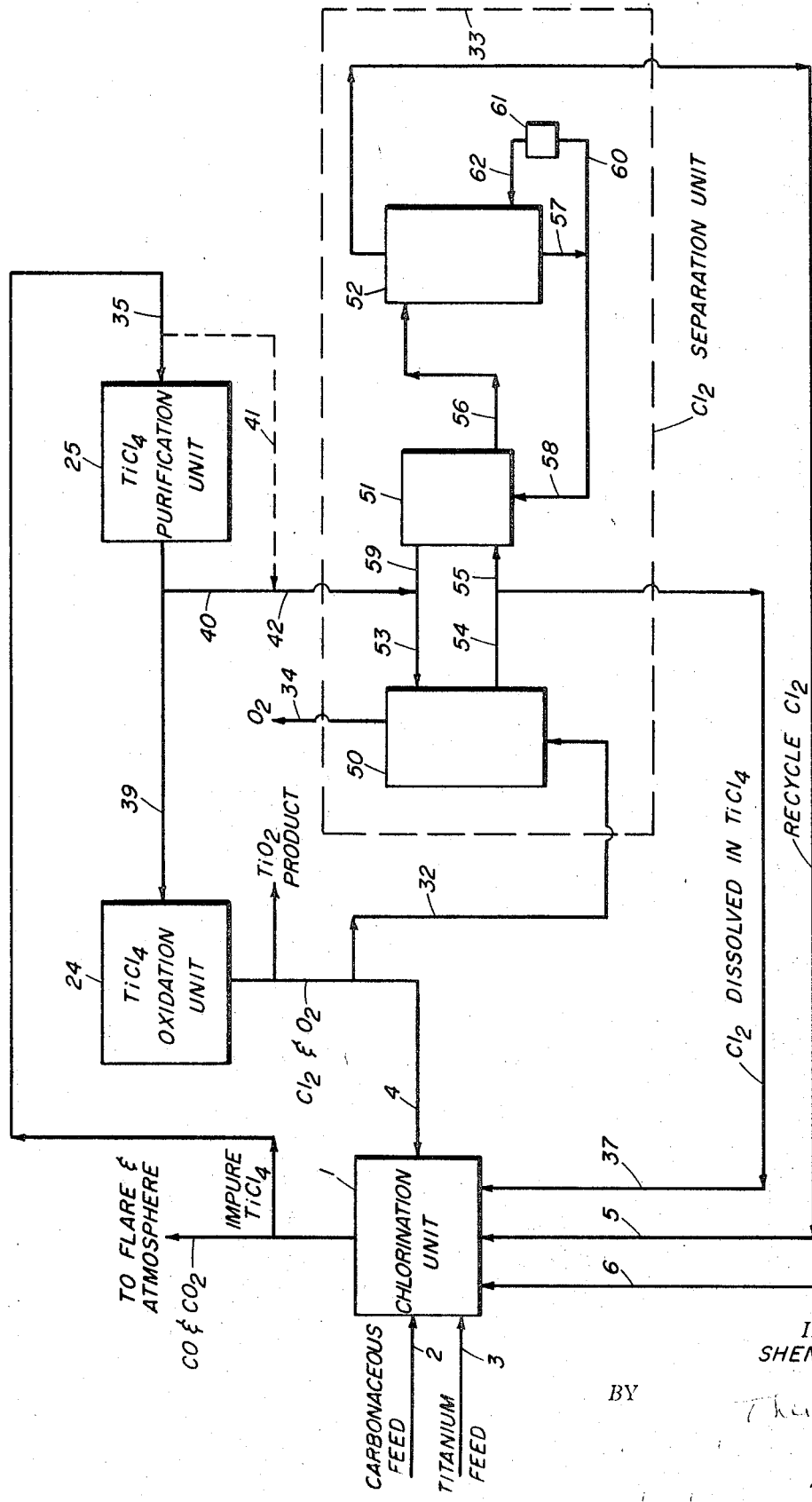

United States Patent Office 3,526,477
Patented Sept. 1, 1970

3,526,477
PROCESS FOR MAKING TITANIUM DIOXIDE
Shen Wu Wan, Wayne, N.J., assignor to American Cyanamid Company, Stamford, Conn., a corporation of Maine
Filed Mar. 4, 1968, Ser. No. 710,364
Int. Cl. C01g 23/02, 23/04
U.S. Cl. 23—202                                                       6 Claims

ABSTRACT OF THE DISCLOSURE

In a chlorination process for producing $TiO_2$ from $TiO_2$ ore, the temperature in the chlorination stage is maintained within the desired range by recycling thereto chlorine-enriched $TiCl_4$. A portion of a chlorine containing gas mixture obtained from an oxidation step is directed to a titanium ore chlorination step. The remainder of the gas mixture is directed to a chlorine separation step wherein a portion of the chlorine is recovered as gas and the remainder of the chlorine is absorbed in liquid titanium tetrachloride. The chlorine gas and a portion of the chlorine dissolved in titanium tetrachloride are directed to the chlorination step.

---

Figure 1:
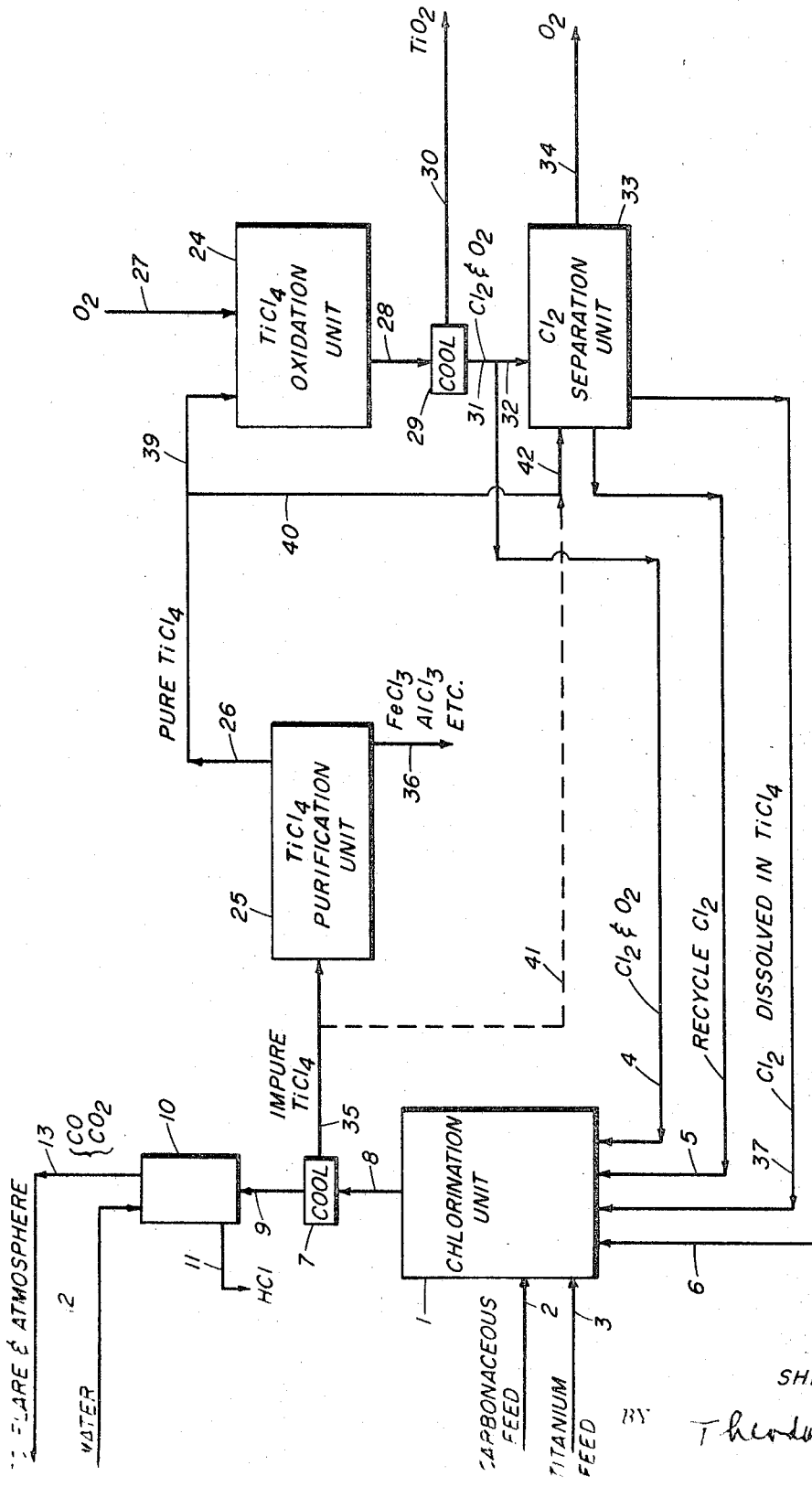

This invention relates to a chlorination process for producing $TiO_2$ from $TiO_2$ ore wherein chlorine-enriched $TiCl_4$ is recycled to an ore chlorination step to maintain the desired temperature therein. More particularly, this invention relates to a chlorination process to produce $TiO_2$ wherein $TiCl_4$ is employed to absorb chlorine from by-product gases and the resulting chlorine dissolved in $TiCl_4$ is recycled to a $TiO_2$ ore chlorination step in an amount sufficient to maintain a desirable temperature therein.

BACKGROUND OF THE INVENTION

Titaniferous ore can be converted to pigmentary titanium dioxide by chlorination, to obtain a $TiCl_4$ solution which is usually purified, followed by oxidation of the $TiCl_4$ solution to obtain both pigmentary $TiO_2$ and a gaseous mixture comprising chlorine, and oxygen. Usually, only a small portion of the gas mixture can be recycled to the initial chlorination unit because the oxygen content thereof causes excessive chlorination temperatures. Thus, in order to recover chlorine for use in the chlorination step, the major portion of the gaseous mixture is treated to separate chlorine from the oxygen by selectively absorbing chlorine in a suitable absorbent, such as liquid $TiCl_4$. In present processes, the chlorine is stripped from the absorbent and the chlorine gas is recycled to the chlorination stage. Operating in this manner requires relatively large stripping capacity for the overall process which is expensive to operate and maintain. It is desirable to minimize the amount of gas stripped from the $TiCl_4$ in order to reduce the overall process heating requirements while preventing undesirably high temperatures in the chlorination step.

It is an object of the present invention to provide a process for producing titanium dioxide wherein excess chlorine gas is recycled to a $TiO_2$ ore chlorination step without effecting undesirably high temperature therein. It is a further object of the present invention to provide a process for producing titanium dioxide while minimizing needed process stripping capacity. Further objects of the present invention will become evident from the following detailed description.

According to the process of the invention, it has been found that the difficulties of the prior practice can be overcome in a straight-forward and economical manner by selectively absorbing, with $TiCl_4$, $Cl_2$ from a gas mixture obtained from a $TiCl_4$ oxidation step and thereafter recycling a portion of the chlorine enriched $TiCl_4$ to a titanium ore chlorination step. The gas mixture or a portion thereof is directed to a chlorine separation step having an absorption tower, a stripping tower and means for circulating liquid $TiCl_4$ between the towers. In the absorption tower, $TiCl_4$ is countercurrently contacted with a portion of the gas mixture of $Cl_2$ and $O_2$ obtained from the $TiCl_4$ oxidation step. A portion of the chlorine dissolved in $TiCl_4$ liquid is withdrawn from the absorber and directed to the chlorinator. The remaining chlorine dissolved in $TiCl_4$ is circulated to the stripping tower and heated to separate chlorine gas from the $TiCl_4$. The chlorine gas is recycled to the chlorination stage and the stripped $TiCl_4$ is cooled and recycled to the absorption tower. Make-up $TiCl_4$ is directed to the absorption tower from the chlorination step and/or a purification step for purifying $TiCl_4$ obtained from the chlorination step.

The process of this invention provides substantial advantages over the prior art processes. Added amounts of the gas from the oxidation step can be directly introduced into the chlorination unit without risking high reaction temperatures in the chlorination unit since the $TiCl_4$ and dissolved $Cl_2$ recycled to the chlorination unit have an endothermic effect on the chlorination reaction. Thus, the needed stripping capacity and thus the heating requirement, is substantially reduced for the overall process since the $Cl_2$ enriched $TiCl_4$ solution is directed to the chlorination stage directly from the absorption step without first being passed through the stripping step. These advantages of this process are obtained while utilizing all the chlorine gas obtained as a by-product in the process.

The amount of chlorine dissolved in $TiCl_4$ directed to the chlorination unit is sufficient to maintain the temperature in the chlorination unit in the range of between about 950° C. and about 1050° C., preferably between about 975° C. and about 1025° C. In order to maintain the desired reaction temperature without recycling excessive amounts of $TiCl_4$, it is desirable to recycle to the chlorination unit less than about 50 volume percent of the gas mixture obtained from the oxidation step. When recycling more than about 50 volume percent of the gas mixture to the chlorination unit the $TiCl_4$ which must be recycled to maintain desirable chlorination temperatures becomes undesirably excessive and thereby seriously reduces the rate of $TiO_2$ production for the overall process. This is because the increased amount of $TiCl_4$ needed as an endotherm is obtained either directly or indirectly from the $TiCl_4$ feed stream to the oxidation step wherein $TiO_2$ is produced. The amount of chlorine dissolved in $TiCl_4$ withdrawn from the absorption tower to maintain the desired chlorination temperature is usually between about 10 and about 25 volume percent of the $TiCl_4$ circulated between the absorption tower and the stripping tower. The make-up $TiCl_4$ supplied to the chlorine separation unit is supplied as either impure $TiCl_4$ from the chlorination unit or as pure $TiCl_4$ from the $TiCl_4$ purification unit or as a mixture of both streams.

The invention will be further described with reference to the accompanying drawings, in which FIG. 1 is a flow diagram of the overall process for effecting a titanium-ore chlorination and oxidation, and in which FIG. 2 illustrates, in detail, the manner for utilizing $TiCl_4$ to recover chlorine gases from the gas mixture from the $TiCl_4$ oxidation unit and to recycle the chlorine to the chlorination unit.

Referring now to the FIG. 1, into a chlorination unit 1, there is charged coke through feed line 2, a $TiO_2$ containing ore through feed line 3, a chlorine-containing gas mixture through line 4 from oxidation unit 24, recycle $Cl_2$ gases through feed line 5, make-up $Cl_2$ containing gas through feed line 6 and $Cl_2$ enriched $TiCl_4$ from $Cl_2$ separation unit 33 through feed line 37. The manner for obtaining recycle $Cl_2$ containing gas and $Cl_2$ dissolved in $TiCl_4$ will be described in detail with reference to FIG. 2. The feed rates of the respective materials to chlorination unit 1 as well as conditions of temperature and pressure therein are maintained to convert the titanium compounds in the ore to $TiCl_4$ and to convert coke to CO as well as $CO_2$. A gaseous mixture is recovered from the chlorination unit 1 and directed to cooling step 7 through feed line 8. In cooling step 7, the gaseous metallic compounds including $TiCl_4$ are condensed and separated from an uncondensed gas mixture which includes CO, $CO_2$ and HCl. The uncondensed gas mixture is directed through feed line 9 into a water scrubber 10 from which HCl is removed through conduit 11 and into which $H_2O$ is introduced through line 12. The $H_2O$-insoluble CO and $CO_2$ gases removed from the scrubber 10 through line 13 are directed to an atmospheric flare.

Impure $TiCl_4$ is removed from cooling zone 7 through line 35 and directed to $TiCl_4$ purification unit 25 wherein impure $TiCl_4$ is separated from other metallic chloride solids such as ferric chloride and aluminum chloride. The metallic chlorides other than $TiCl_4$ are removed from purification unit 25 through line 36. The pure $TiCl_4$ is removed from purification unit 25 through line 26 and treated in a manner hereinafter described.

To the oxidizing zone 24 are added pure $TiCl_4$ obtained from a purification zone 25 and fed through lines 26 and 39, and oxygen, fed separately through line 27. Reaction conditions maintained in the oxidizing zone 24 are maintained to convert $TiCl_4$ to $TiO_2$.

The gaseous mixture from oxidizing zone 24 is removed therefrom through line 28 and directed to cooling zone 29. In zone 29, the gas and $TiO_2$ are cooled to permit collection of pigmentary solids which are separated from uncondensed gases. The $TiO_2$ is removed from cooling zone 29 through line 30 and recovered.

The uncondensed gaseous mixture issuing from the cooling zone 29 through line 31 comprises $Cl_2$ and $O_2$. A portion of the mixture is diverted through line 4 and is fed into the chlorination unit 1. The remaining portion of the gas mixture from line 31 is introduced through line 32 into a chlorine separator zone 33. In the chlorine separation zone 33, $Cl_2$ is absorbed with $TiCl_4$ obtained either as pure $TiCl_4$ from line 40 or as impure $TiCl_4$ from line 41 or a mixture thereof. The unabsorbed $O_2$ gases are removed through line 34. Substantially pure chlorine is removed through line 5 and recycled to the chlorination unit 1. Chlorine dissolved in $TiCl_4$ is removed from $Cl_2$ separation zone 33 through line 37.

In FIG. 2, the chlorine separation unit 33 referred to in FIG. 1 is shown in greater detail together with the chlorination unit 1, the $TiCl_4$ oxidation unit 24 and the $TiCl_4$ purification unit 25. The chlorine separation unit 33 comprises an absorber 50, a heat exchanger 51 and a stripper 52. A gas mixture from the $TiCl_4$ oxidation unit 24 is directed in part through line 4 to chlorination unit 1. The remainder of the gas stream is introduced through line 32 into an absorber tower 50 maintained at a temperature of from −15° C. to +55° C. and a pressure of from 75 to 90 p.s.i.a. The absorber 50 comprises but one section of the overall chlorine separating unit 33 (shown in FIG. 1). Liquid $TiCl_4$ absorbent is introduced from line 40 and/or 41 and line 42 and 53 into absorber 50 in counterflow to the gas stream introduced through line 32. In the absorber, $Cl_2$ is preferentially absorbed by $TiCl_4$ and the unabsorbed mixture of $O_2$ is removed from absorbers 50 through line 34. The $Cl_2$ dissolved in $TiCl_4$ is removed from absorber 50 through line 54 and a portion thereof is directed through line 37 to the chlorination unit 1.

The remaining chlorine dissolved in $TiCl_4$ solution stream passes through line 55 into a heat-exchanger 51 wherein it is heated and ultimately passes through line 56 into the upper portion of a stripper 52. Chlorine is vaporized from the $TiCl_4$ in the stripper 52 which is maintained at a temperature of 170° C. to 185° C. and a pressure of from 35 to 45 p.s.i.a. Separated chlorine gas is removed from stripper 52 through line 5 and introduced into the chlorination unit 1. The major portion of chlorine-stripped and heated liquid $TiCl_4$ is withdrawn through line 57 at the lower section of stripper 52 and is directed to heat-exchanger 51 through line 58 and finally returned to absorber 50 through lines 59 and 53. A minor portion of the chlorine-stripped liquid $TiCl_4$ is returned to the stripper 52 through line 60, a boiler 61 and line 62. Sufficient heat is supplied to the returning liquid $TiCl_4$ by means of the boiler 61 in order to maintain the desired stripping temperatures.

I claim:
1. In a process for producing $TiO_2$ from a titanium-containing material by chlorinating said material in a chlorination zone in the presence of a carbonaceous material to give an impure $TiCl_4$ stream at least a portion of which is treated to give a pure $TiCl_4$ stream and oxidizing at least a portion of the pure $TiCl_4$ to give $TiO_2$ and a chlorine containing off-gas which is passed to said chlorination zone, the improvement which comprises: selectively absorbing chlorine from part of said off-gas with $TiCl_4$ to obtain chlorine dissolved in $TiCl_4$, recycling at least a portion of the chlorine dissolved in $TiCl_4$ to the chlorination zone, recovering the dissolved chlorine from the remainder of the $TiCl_4$ and recycling said recovered chlorine to said chlorination zone.

2. The process of claim 1 wherein the reaction temperature is maintained between about 950° C. and about 1050° C.

3. The process of claim 1 wherein the $TiCl_4$ absorbent is obtained from the impure $TiCl_4$ stream.

4. The process of claim 1 wherein the $TiCl_4$ absorbent is obtained from the pure $TiCl_4$ stream.

5. The process of claim 1 wherein the $TiCl_4$ absorbent is obtained from both the pure and the impure streams.

6. The process of claim 1 wherein the reaction temperature is maintained between about 975° C. and about 1025° C.

References Cited

UNITED STATES PATENTS

| | | | |
|---|---|---|---|
| 2,486,912 | 11/1949 | Belchetz | 23—87 |
| 2,675,891 | 4/1954 | Frey | 23—87 XR |
| 2,701,180 | 2/1955 | Krchma | 23—87 |
| 2,758,019 | 8/1956 | Daubenspeck et al. | 23—87 XR |
| 2,777,756 | 1/1957 | Anazawa et al. | 23—87 XR |
| 2,792,077 | 5/1957 | Mas et al. | 23—87 XR |
| 2,868,622 | 1/1959 | Bennett et al. | 23—87 |
| 3,120,427 | 2/1964 | Mas et al. | 23—202 |
| 3,351,427 | 11/1967 | Wendell et al. | 23—202 |
| 3,445,183 | 5/1969 | Cairns | 23—87 |

EDWARD STERN, Primary Examiner

U.S. Cl. X.R.

23—87, 219